March 17, 1964 — W. H. HULTGREN — 3,125,063
SIGNAL DEVICE
Filed Oct. 4, 1962 — 2 Sheets-Sheet 1
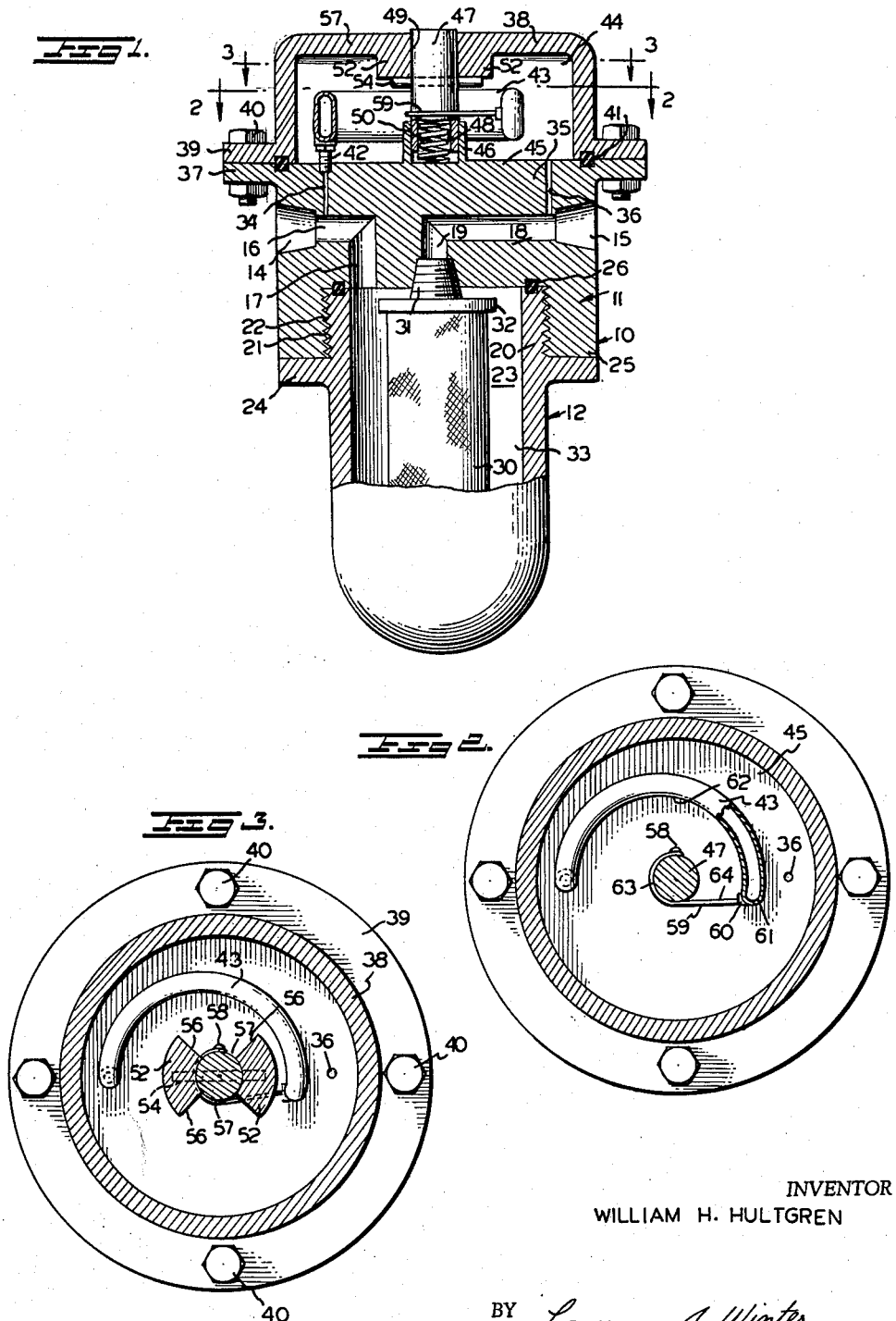
INVENTOR
WILLIAM H. HULTGREN
BY *Lawrence J. Winter*
ATTORNEY

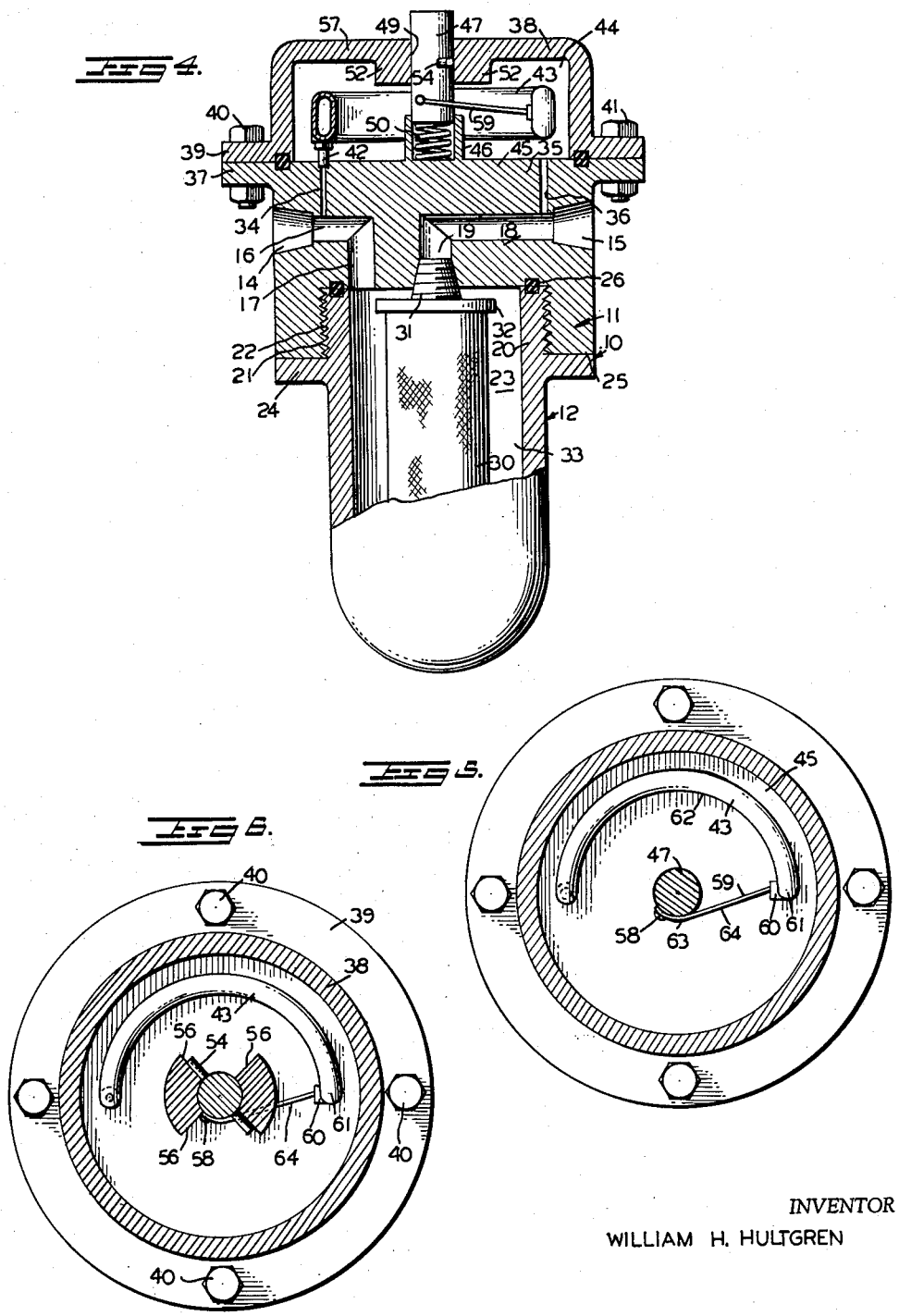

United States Patent Office 3,125,063
Patented Mar. 17, 1964

3,125,063
SIGNAL DEVICE
William H. Hultgren, Mount Carmel, Ill., assignor to Purolator Products, Inc., Rahway, N.J., a corporation of Delaware
Filed Oct. 4, 1962, Ser. No. 228,364
12 Claims. (Cl. 116—70)

The present invention relates to a signal or indicator device and more particularly, to an indicator device that may be used in connection with filters, although it may be used with many other types of apparatus and equipment.

In accordance with the present invention differential pressure means are provided for determining when a differential pressure above a certain value is exceeded to thereby actuate or operate an indicator device to inform an operator of such circumstances.

It is an object of the present invention to provide an indicator device having Bourdon differential pressure means embodied in a housing for sensing the differential pressure across a filter incorporated in a fluid system to enable the operator to know when the filter must be cleaned or replaced to maintain the finest degree of filtration possible.

It is another object of the present invention to provide a Bourdon tube type differential pressure sensing means that can be enclosed within a filter housing, or the like, and the movement of the Bourdon tube means in response to the differential pressure across a filter in the housing is transmitted through actuating means to a signal rod means.

It is another object of the present invention to provide a compact indicator device that can be fitted within a cavity in a housing in which a filter in a fluid line system is disposed.

It is another object of the present invention to provide an indicator device having a minimum number of parts and which parts are of a simple construction so as to be easily fabricated and require less machining in manufacturing the indicator device.

It is another object of the present invention to provide a Bourdon type differential pressure sensing means in combination with flexible actuating means which respond to the motion of the Bourdon means and transmits said motion to an indicator or signal rod means to indicate a differential pressure above a predetermined value has been exceeded.

It is another object of the present invention to provide an indicator device having Bourdon type differential pressure sensing means that can be formed integral with the housing of a filter disposed in a fluid line.

It is another object of the present invention to provide a differential pressure indicator device for use in a liquid system such as a filtering system in which the differential pressure across a filter is directly transmitted to or against both the interior and the exterior of Bourdon pressure sensing means whereby the Bourdon means moves or tends to flatten out in a non-straight line movement which movement is transmitted through flexible means to an indicator or signal rod means.

It is another object of the present invention to provide an indicator device having flexible cable means which converts the non-linear movement or motion of a Bourdon type differential sensing means into rotary motion in order to permit the indicator or signal rod to move in a linear or straight line direction.

It is another object of the present invention to provide a Bourdon type differential pressure sensing means having flexible actuating means for an indicator rod means that converts the non-linear movement of the Bourdon means into rotary movement in order to permit the indicator rod to move in a straight line direction, and which flexible means compensate for the non-linear movement of the Bourdon means.

It is another object of the present invention to provide a Bourdon type indicating device that is of a compact nature and can be fitted entirely within the housing or casing in which is mounted a filter.

It is another object of the present invention to provide a Bourdon type differential pressure sensing means disposed in a filter housing having a closed flexible tube in communication with the upstream side of a filter cartridge, with the exterior surface of the Bourdon means in communication with the downstream side of a filter cartridge to directly measure the differential pressure across the filter cartridge so that it can be transmitted to a signal rod to indicate when the differential pressure exceeds a predetermined value.

It is another object of the present invention to provide a compact Bourdon type differential pressure sensing means for incorporation in a filter housing which responds directly to the differential pressure across a filter cartridge and transmits a differential pressure signal through positive mechanical means to an indicator rod and eliminates the use of a second Bourdon type differential pressure sensing means as used in systems heretofore.

It is another object of the present invention to provide a Bourdon type differential pressure sensing means incorporated in a housing which housing may have mounted therein a filter or the like in which the low pressure side of the housing has the Bourdon means disposed therein so as to eliminate or replace the usual pressurized housing of a Bourdon gauge, and makes the Bourdon means part of the filter housing or assembly itself, and not an auxiliary device. The interior of the Bourdon sensing means is connected to the high pressure chamber of the housing or the filter upstream side. With this structure the Bourdon means can actuate a pop-up device or poppet member and transmit the differential pressure signal to the exterior of the filter housing.

In accordance with the present invention a housing is provided having Bourdon differential sensing means disposed in communication with the high pressure side of the housing, and which Bourdon differential pressure sensing means is mounted within a low pressure side or chamber of the housing so that the differential pressure across said high pressure and low pressure sides or chambers is transmitted directly against the Bourdon differential pressure sensing means to cause movement thereof, which movement by means of flexible actuating means secured thereto is transmitted to an indicating or signal rod means so that the non-linear or non-straight line movement of the Bourdon means in response to differential pressure above a predetermined value causes the flexible means to actuate the signal rod means in a rotary direction, so that signal rod release means causes the signal rod to move in a linear or straight line direction or motion.

Various other objects and advantages of the present invention will be readily apparent from the following detailed description when considered in connection with the accompanying drawings forming a part thereof, and in which:

FIG. 1 is an elevational view partly broken away and in section illustrating the indicator device shown in use with a filter system, and in which the signal device is in a non-signaling position;

FIG. 2 is a transverse section taken along lines 2—2 of FIG. 1;

FIG. 3 is a transverse section taken along lines 3—3 of FIG. 1;

FIG. 4 is a transverse view similar to FIG. 1 but illustrating the indicator device in a signaling position;

FIG. 5 is a view similar to FIG. 3, that is taken along lines 2—2 of FIG. 1, but illustrating the indicator device in a signaling position; and FIG. 6 is a view similar to FIG. 3 but illustrating the indicator device in a signaling position.

Referring to the drawings, the reference numeral 10 generally designates a filter assembly or housing comprising a head 11 and a cylindrical casing or body member 12. The head and casing are of metal and preferably made of aluminum or other non-corrosive materials. The head 11 is provided with an inlet passage 14 and an outlet passage 15 for connecting the housing into a liquid line such as a lubricating oil or hydraulic system. The passage 14 has a horizontal portion 16 and a vertical portion 17 while the outlet passage 15 has a horizontal portion 18 and a threaded vertical portion 19.

The casing 12 has a threaded portion 20 or the upper end thereof. The head 11 is provided with mating internal threads 22 thereon which mate with the threads 21 of the casing. The head is provided with a cylindrical recess 23 in the bottom thereof into which fits the upper end of the casing, as best seen in FIG. 1. The threaded section 20 of the casing is provided with annular rim or flange 24 therearound which abuts against the lower end 25 of the head when the casing is completely threaded therein. An O-ring seal 26 is provided in the head adjacent the portion thereof where the upper edge of the threaded portion 20 abuts the top of the recess 23 to form a liquid tight connection between the casing and the head.

A filter cartridge or element 30 that is preferably made of woven wire cloth, though it may be of other types, is disposed in the casing 12. The filter cartridge 30 is provided with a threaded nipple 31 secured to the upper end cap 32 of the filter element and threaded into the lower end of the threaded vertical portion 19 of the discharge passage 15 to form a liquid tight connection therewith. The upper portion of the filter element 30 extends into the recess 23 of the head, while the lower portion thereof is enclosed within the annular chamber 33 formed by the casing 12. The chamber 33 and the inlet passage 14 in communication with the chamber provide the upstream side of the filter element and the high pressure chamber or side of the housing.

A small connecting passage or bore 34 is drilled vertically through the upper end 35 of the head and extends completely therethrough and has its lower end in communication with the horizontal portion 16 of the inlet passage 14. A second vertical passage 36 similar to passage 34 is drilled in the opposite side of the upper end 35 of the head and extends completely therethrough with the lower end thereof communicating with the horizontal portion 18 of the outlet passage 15.

The head is provided with an annular rim or flange 37 extending around the upper edge thereof, and has a cupped-shapped cover member 38 disposed thereon. The cover member 38 is provided with a flange 39, similar to flange 37 of the head, and a plurality of circumferentially spaced bolt members 40 secured to secure the cover and head to each other. An O-ring seal 41 is disposed in complementary recesses in the mating faces of flanges 37 and 39 to provide a fluid type connection therebetween, though, of course, it is realized that a flat ring gasket or other type of washer could be used for sealing purposes if desired.

The upper end of the small passage 34 has a threaded connection 42 secured therein which connection in turn is secured to a conventional Bourdon tube 43 disposed in the cavity or chamber 44 provided by the cover 38. The Bourdon tube 43 has the pressure of the liquid flowing in inlet passage 14 directly transmitted through the passage 34 and the nipple connection 42 to the interior of the Bourdon tube 43. Bourdon tube 43 is disposed horizontally within the chamber 44 and is disposed therein so as to be completely spaced from the interior surface of the cover 38 so as it will not come in contact therewith at any time. The interior of the Bourdon tube 43 therefore forms part of the upstream side of the housing or the high pressure chamber of the housing.

The chamber or cavity 44 formed by the cover 38 communicates with the small passage 36 and with the horizontal portion 18 of the outlet or discharge passage 15 and therefore with the interior of the filter element 30 through the nipple connection 31 and the vertical portion 19 of the discharge passage 15 so that this cavity 44 is on the downstream side or the low pressure chamber of the housing and forms part thereof. This eliminates the need for a pressurized gauge housing for the Bourdon tube, as generally found in conventional systems, and makes it part of the filter housing itself and not an auxiliary device, but instead an integral part of the filter housing. This provides a simple and compact arrangement that can be easily enclosed within a conventional filter housing as now made and in use in installations already in the field, and thereby makes the installation easily fabricated and economical.

The upper surface or face 45 of the head 11 which forms the bottom of the cavity 44 has formed integral therewith a vertical sleeve or nipple 46 which is disposed centrally of the top surface 45. The nipple 46 is a blind nipple and has disposed therein a poppet member, or signal or indicator rod 47 that is slidably disposed within the nipple 46. The upper end of the rod 47 is solid while the lower end is provided with a cylindrical recess 48 therein.

The indicator rod 47 has its upper end disposed in an aperture or bore 49 extending through the center of the member 38. A spring member 50 is disposed within the nipple 46 and fits within the recess 48 of the indicator rod 47, so as to provide biasing means normally urging or forcing the indicator rod 47 toward a signaling position or in an upward direction. Sealing means may be provided between the inner surface of the bore 49 and the outer surface of the rod 47 by any well known means to provide a liquid tight seal therebetween, and other sealing means may be provided between the interior surface of the nipple 46 and the exterior surface of the rod 47 adjacent the recess 48 therein, but these have not been shown in the drawing for purposes of clarity.

The cover member 38 is provided with identical arcuate segments or wedge members 52 formed integral therewith adjacent the aperture 49 therein. The segments 52 extend vertically a substantial distance below the top wall 53 of the cover 38 and provide stop members for preventing the indicator rod or poppet member 47 from popping out of the cover 38 and extending above the head to indicate the filter requires servicing because it is clogged or dirty. The stop members 52 are disposed opposite one another as best seen in FIG. 3.

A horizontal pin member or bar 54 extends completely through the indicator rod 47 and abuts the underside or the bottom side of the segments 52 when the indicator device is a non-signaling position, as illustrated in FIGS. 1–3. The pin 54 is disposed in a horizontal plane above the Bourdon tube 43 so there can be no interference therewith. When the pin 54 is rotated with the indicator rod 47 a sufficient distance so as to clear the sidewalls 56 of the segments 52 and to be in alignment with the space 57 between these side walls, the pin will be disengaged from the stops to a linear direction upwardly so that the rod extends above the top wall of the cover 38.

The lower end of the rod member 47 is provided with a pin 58 secured thereto, and connecting one end of a flexible cable 59 to the indicator rod. The pin 58 and the horizontal cable 59 are secured to the rod in a plane in alignment with the longitudinal axis of the horizontal Bourdon tube 43. The opposite end of the flexible cable 59 is secured by a member 60 to the free end 61 of the Bourdon tube which tends to flatten out as the differential pressure across it increases. The cable is secured to the rod 47 at a position facing the inner curved portion 62 of the Bourdon tube 43 so that the cable 59 has a portion 63 thereof wrapped approximately half-way around the rod 47 with the straight portion 64 thereof approximately in alignment with the peripheral portion of rod 47 opposite the pin 58. At this time the pin member 54 extending through the rod 47 is disposed centrally of the segments 52 and abuts the lower side thereof, as best shown in dotted lines in FIG. 3 and the signal device is in a non-signaling position. At this time the differential pressure across the Bourdon tube is relatively small or of such an insignificant nature so that it will not cause the indicator rod to move to a signaling position. The flexible cable 59 is of sufficient length to extend between the pin 58 and the free end 61 of the Bourdon tube 43 so that it is not slack but is sufficiently tensioned or taut without affecting the normal free state position of the Bourdon tube, and so as to readily react and to be actuated or moved when the Bourdon differential sensing tube begins to move and flatten out in response to an increase in the differential pressure between the upstream and the downstream sides or chambers of the housing.

In operation the lubricating oil to be filtered enters the housing through the inlet passage 14 and passes through the inlet passage portions 16 and 17 and into the chamber 33 in the casing 12. Thereafter the filter passes in an outside-in direction through the woven wire cloth element 30 and is filtered with any contaminants and dirt in the oil being deposited on the upstream side of the woven wire cloth filter element. Thereafter the clean oil flows upwardly into the interior of the nipple 31 and through portions 19 and 18 of the discharge passage 15 and out of the housing.

A small portion of the incoming oil in passing through the inlet passage 14 passes through the horizontal portion 16 and the small vertical passage or orifice 34 upwardly through connection 42 into the interior of the Bourdon tube 43.

Another portion of the oil in passing through the discharge portion 18 of the outlet passage 15 passes through the small passage connection 16 into the low pressure cavity 44 in the head 38 and transmits its force against the exterior of the Bourdon tube 43. With the above operation, it is realized that the oil pressure on the upstream side of the housing and the upstream side of the filter element and the oil pressure on the downstream side of the filter element and the downstream side of the housing are transmitted directly against both sides of the Bourdon tube so that any difference in the pressure across the upstream and the downstream sides of the housing and filter cartridge is directly transmitted against both sides of the Bourdon tube and, hence, it acts as a very sensitive differential pressure sensing mechanism.

When the filter cartridge 30 becomes sufficiently clogged with contaminants and dirt removed from the oil stream being flowed therethrough, the oil pressure on the upstream side of the filter increases while the oil pressure on the downstream side of the filter element and the low pressure side of the housing either remains the same or decreases, and therefore causes an increase in the differential pressure normally maintained between the opposite sides of the filter element and the opposite sides of the filter housing, or the upstream and downstream sides of the housing.

The Bourdon tube adjacent the free end 61 then tends to straighten or flatten out and moves progressively from the position shown in FIG. 3 to the position shown in FIG. 6. Since the fixed end at connection 42 of the Bourdon tube cannot move, the movement of the free end 61 will cause the cable 59 to be pulled and rotate the indicator rod 47 from the position shown in FIG. 3 to the position shown in FIG. 6 with the cable 59 gradually unwinding so that the portion 63 thereof is not wrapped around the rod member as much as it was before. The cable is of sufficient length so that the indicator rod 47 will be rotated an amount sufficient to move the stop pin 54 beyond the side edges 56 of the segment 52 so that the pin is in the clear space 57 between the segments when the differential pressure across the filter housing and the filter element exceeds a predetermined value indicating that the filter element requires cleaning. When the pin 54 has cleared the stops 52, the spring member 50 which is constantly urging the rod 47 in an upward direction then causes the rod 47 to move from its non-signaling position, as shown in FIGS. 1 and 3, to the position shown in FIG. 4 at which time the rod 47 extends a substantial distance above the top of the cover member 38 indicating that the filter is clogged to an operator. Upon movement of the rod 47 in an upward direction, it is also to be noted as best shown in FIG. 4 that the flexible cable member 59 assumes an inclination or is then at an angle slightly inclined with respect to the horizontal plane. The operator may then dismantle the casing and the head from each other and remove the filter for cleaning purposes, and thereafter insert it back within the housing.

When it is desired to reset the device after the filter has been cleaned, it is only necessary for the operator to push the rod 47 back downwardly into the housing and to turn the rod 47 in a direction opposite to that direction of rotation by the cable member 59 so that the pin member 54 will again be disposed below the segments 52 and cannot pop out of the housing again until it is actuated by the Bourdon tube when the Bourdon tube senses a differential pressure above a predetermined value again indicating that the filter is clogged.

Thus, from the foregoing description, it is apparent that the present invention provides an indicator device in which a Bourdon type differential pressure sensing means is provided that is incorporated within a housing and forms an integral part thereof and eliminates the need for the usual gauge housing associated with a Bourdon tube.

It is also obvious that the present invention utilizes a Bourdon type differential pressure sensing means connected to a flexible cable that converts the non-linear movement of the Bourdon tube into a rotational movement of a shaft of poppet member so that the poppet member may be moved in a straight line or linear direction to indicate that the filter element has become clogged within the housing.

The present invention further provides means for compensating for the non-linear movement by cable means connected between a Bourdon type differential pressure sensing means and a poppet type indicator rod.

In addition, the present invention provides a poppet member connected to a flexible cable which in turn is connected to a Bourdon type differential pressure sensing means for indicating when a filter element and the like has become clogged which poppet member is so mounted in the housing that any change in the oil operating conditions of the liquid passing through the housing will have no effect whatsoever on the indicating means and it will always operate at the predetermined differential pressure setting for which it is designed, since the changes in the oil pressures are transmitted equally to opposite sides of the Bourdon tube.

It is also to be noted that the present indicator device provides a simple mechanism that can be used within a conventional housing now in common use and has a minimum number of parts and greatly reduces the fabrication and assembly of the parts.

In as much as changes may be made in the form, location and relative arrangement of the several parts of the invention without departing from the principle of the invention, it will be understood that the invention is not to be limited except by the scope of the appended claims.

What is claimed is:

1. A differential pressure indicator device comprising a housing having a high pressure side and a low pressure side, a rotatable member located in said housing and axially moveable from a non-signaling position to a signaling position, means urging said member in an axial direction toward said signaling position, a Bourdon tube differential pressure sensing means disposed in the low pressure side of said housing in a plane normal to the axially moveable direction of said member and encircling said member, the interior of said tube means being in communication with the high pressure side of said housing so differential pressure in the housing is directly transmitted thereacross, and flexible cable means extending in a plane substantially parallel to said first mentioned plane and secured to said rotatable member and said tube means for rotating and permitting axial movement of said member to a signaling position when the differential pressure exceeds a predetermined value.

2. A differential pressure indicator device comprising a housing having a high pressure side and a low pressure side, a rotatable and axially moveable member located in said housing and axially moveable from a non-signaling position to a signaling position, means urging said member in an axial direction toward said signaling position, a Bourdon tube differential pressure sensing means disposed in the lower pressure side of said housing in a plane normal to the axially moveable direction of said member and encircling said member with the interior of said tube means being in communication with the high pressure side of said housing so differential pressure in the housing is transmitted directly thereacross and flexible cable means secured to said rotatable and axially moveable member and to said tube means and extending in a plane substantially parallel to said first mentioned plane for moving said member to a signaling position when the differential pressure exceeds a predetermined value.

3. A differential pressure indicator device comprising a housing including a head with a cover member forming a chamber therein, said head having an inlet and outlet for passing fluid to be filtered therethrough, a Bourdon tube in said chamber having its interior in communication with said inlet, means communicating the interior of said tube and said chamber with said outlet for transmitting the differential pressure between said inlet and outlet to said tube, a rotatable and axially moveable member located in said chamber and axially moveable from a non-signaling to a signaling position, means urging said member in an axial direction toward a signaling position, said Bourdon tube encircling said rotatable member and extending in a plane normal to the axially moveable direction thereof, and flexible cable means in said chamber extending in a plane substantially parallel to said first mentioned plane secured to said member and Bourdon tube for moving said member to a signaling position when the differential pressure across said tube exceeds a predetermined value.

4. A differential pressure indicator device comprising a housing including a head with a cover member forming a low pressure chamber therein, said head having an inlet and outlet for passing fluid to be filtered therethrough, a casing connected to said head for containing a filter therein, said inlet being in communication with said casing on the upstream side of the filter and forming a high pressure chamber in the housing, said outlet communicating with said lower pressure chamber and the casing on the downstream side of a filter in the casing, a horizontal Bourdon tube in said lower pressure chamber having its interior communicating with said inlet for transmitting the differential pressure across said inlet and outlet, a sleeve member in said chamber, a vertical rotatable member located in said chamber and slidably disposed in said sleeve member and axially moveable from a non-signaling position to a signaling position, said tube being in a plane normal to said vertical member and encircling it, means urging said rotatable member in an axial direction to a signaling position, and flexible cable means in said chamber extending in a plane substantially parallel to said first mentioned plane connected to said rotatable member and Bourdon tube for moving said rotatable member to a signaling position when the differential pressure across said inlet and outlet exceeds a predetermined value.

5. A differential pressure indicator device comprising a housing including a head with a cover member forming a chamber therein, said head having an inlet and outlet for passing fluid to be filtered therethrough, a horizontal Bourdon tube in said chamber in communication with said inlet, means fixing one end of said tube to said head and the other end of said tube being freely moveable, means communicating the exterior of said tube with said outlet for transmitting the differential pressure between said inlet and outlet to said tube, a sleeve member in said chamber, a vertical rotatable member located in said chamber slidably disposed in said sleeve member and axially moveable from a non-signaling to a signaling position, said tube extending in a plane normal to said vertical member and encircling it, means urging said rotatable member in an axial direction to a signaling position, a flexible cable means in said chamber extending substantially parallel to said first mentioned plane connected to said rotatable member and to the freely moveable end of said tube for rotating said rotatable member to cause it to move to a signaling position when the differential pressure between said inlet and outlet exceeds a predetermined value.

6. A differential pressure indicator device comprising a housing including a head with a cover member thereon forming a chamber therein, said head having an inlet and outlet for passing fluid to be filtered therethrough, a first passage means extending between said chamber and inlet, a second passage means extending between said chamber and outlet, a Bourdon tube in said chamber, means connecting and communicating the interior of said tube with said first passage means for transmitting the differential pressure between said inlet and outlet to said tube, a sleeve disposed centrally in said chamber with said tube extending therearound, a vertical rotatable member having one end slidably disposed in said sleeve and axially moveable from a non-signaling to a signaling position, said tube extending in a plane normal to said vertical member and encircling it, means urging said member to a signaling position, the opposite end of said rotatable member extending through said cover member, flexible cable means in a plane substantially parallel to said first mentioned plane and tied to said rotatable member and the end of said tube opposite said connecting means, stop means on said rotatable member preventing movement and a signaling position until the rotatable member has been rotated, said tube being adapted to rotate the rotatable member to move it to a signaling position when the differential pressure between the inlet and outlet exceeds a predetermined value.

7. The device of claim 6 wherein said stop means includes a horizontal pin extending through said rotatable member, and said cover member has arcuate oppositely disposed segments thereon which abut said pin member when the differential pressure is below said predetermined value.

8. A differential pressure indicator device comprising a head having an inlet and outlet for passing fluid to be filtered therethrough, a casing connected to said head in communication with the inlet and outlet for containing a filter therein disposed between the inlet and outlet, a cover member on said head forming a chamber therein, first passage means extending between said inlet and chamber, second passage means extending between said outlet and chamber, a horizontal Bourdon tube in said chamber, connecting means fixing one end of said tube to said first passage means for communication with said inlet and casing, a sleeve centrally disposed in said chamber, a vertical rotatable axially moveable member having one end slidably disposed in said sleeve, said tube being in a plane normal to said vertical member and encircling it, said cover member having a central opening, the opposite end of said rotatable member extending through said opening, arcuate means spaced around said opening and providing oppositely disposed spaces therebetween, means urging said rotatable member out of said chamber through said opening, stop means on said rotatable member normally abutting said arcuate means, flexible cable means in a plane substantially parallel to said first mentioned plane and tied to said rotatable member and the end of said tube opposite said connecting means, said tube being adapted to rotate said rotatable member until said stop means clears said arcuate means when the differential pressure exceeds a predetermined value between said inlet and outlet to axially move said rotatable member above said cover member.

9. The indicator device of claim 8 wherein said stop means is a pin member extending horizontal to said rotatable member, and said flexible means are disposed in a horizontal plane in alignment with said Bourdon tube.

10. The indicator device of claim 9 wherein said flexible means is a wire.

11. The indicator device of claim 10 wherein said urging means is a spring member disposed in a recess in said rotatable member.

12. The indicator device of claim 11 wherein said cover member is a cup detachably connected to said head and said arcuate means are formed integral therewith.

References Cited in the file of this patent

UNITED STATES PATENTS 3,052,206     Scavuzzo _____ Sept. 4, 1962

FOREIGN PATENTS 342,932     France _____ July 21, 1904
553,782     Italy _____ Jan. 2, 1957